Figure 1:
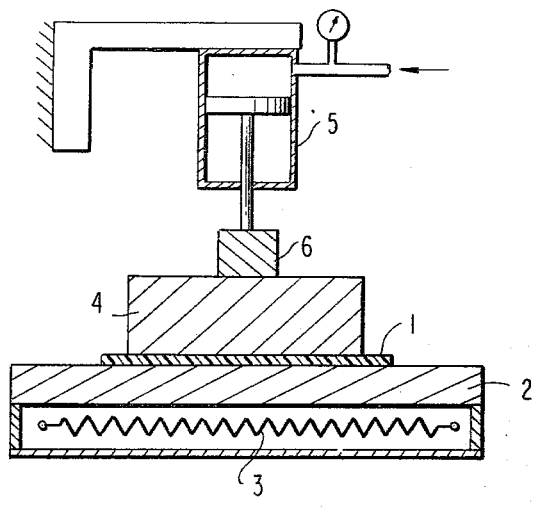

United States Patent [19]

Andersson

[11] 4,251,307
[45] Feb. 17, 1981

[54] METHOD FOR COATING A RECTANGULAR CUPBOARD DOOR OR THE LIKE WITH SEMI-RIGID PLASTIC SHEETING

[76] Inventor: Jan Andersson, Stalverksgatan 3, Västeras, Sweden

[21] Appl. No.: 69,132

[22] Filed: Aug. 23, 1979

Related U.S. Application Data

[63] Continuation-in-part of Ser. No. 870,167, Jan. 17, 1978, abandoned.

[30] Foreign Application Priority Data

Jan. 18, 1977 [SE] Sweden ................................ 7700454

[51] Int. Cl.³ .................... B32B 31/04; B32B 31/16
[52] U.S. Cl. .................... 156/163; 156/213; 156/216; 156/229; 156/322
[58] Field of Search .............. 156/160, 212, 213, 216, 156/322, 479, 229, 163

[56] References Cited

U.S. PATENT DOCUMENTS

| | | | |
|---|---|---|---|
| 2,576,121 | 11/1951 | Kamborian | 156/216 |
| 2,828,799 | 4/1958 | Harrison | 156/213 |
| 3,067,082 | 12/1962 | Leigh | 156/213 |
| 3,149,018 | 9/1964 | Jacobsen | 156/213 |
| 3,580,770 | 5/1971 | Dyal | 156/216 |
| 3,654,012 | 4/1972 | Schlager | 156/212 |

Primary Examiner—Jerome W. Massie
Attorney, Agent, or Firm—Sughrue, Rothwell, Mion, Zinn and Macpeak

[57] ABSTRACT

A clamping force of given strength is directed at right angles to a rectangular piece of plastic sheeting whose width and length are somewhat greater than that of a cupboard door with the piece of plastic sandwiched between the door and an evenly heated supporting plate which is maintained at constant temperature of at least 50° C., and the projecting marginal edges of the plastic sheeting are stretched and subsequently pressed against the surface portion on the rear side of the cupboard door preheated with contact glue. The applied clamping force must be sufficient to prevent the portion of sheeting from being pulled out from between the plate and the cupboard door front while permitting that sheet portion to be stretched and extended along with the marginal portion through which the stretch force is exerted, but the force may not be so excessive that the stretching or extension of that sheet portion is prohibitive.

1 Claim, 4 Drawing Figures

METHOD FOR COATING A RECTANGULAR CUPBOARD DOOR OR THE LIKE WITH SEMI-RIGID PLASTIC SHEETING

This application is a continuation-in-part application of Application Ser. No. 870,167 filed Jan. 17, 1978, now abandoned.

The present invention relates to a method for coating a rectangular cupboard door or the like with semi-rigid plastic sheeting.

When coating with semi-rigid plastic sheeting material, the sheeting material is usually glued to the surface, and normally with the help of a glue which is self-curing or which cures upon heating. Apart from the fact that the known method is not satisfactory from the point of view of refractoriness and health, it has the disadvantage that it is difficult to remove the plastic sheeting material and the glue if, later on, one would wish to surface finish the doors in some other way or coat the door surfaces with another material.

The above-mentioned drawbacks are avoided in a method according to the invention by stretching the material over the surface that is to be coated without gluing the sheeting against this surface, similar to the normal procedure when using elastic sheeting. The pattern of the decoration is normally a venation running in the longitudinal direction of the plastic sheeting tape, and it has proved that a curving or obliqueness of the venation pattern easily occurs when a semi-rigid plastic sheeting it to be stretched over a surface. In a method according to the invention, the stretching of the plastic sheeting is performed in a special manner by which misformation of the structure of the decoration of the sheeting is avoided.

Figure 2:
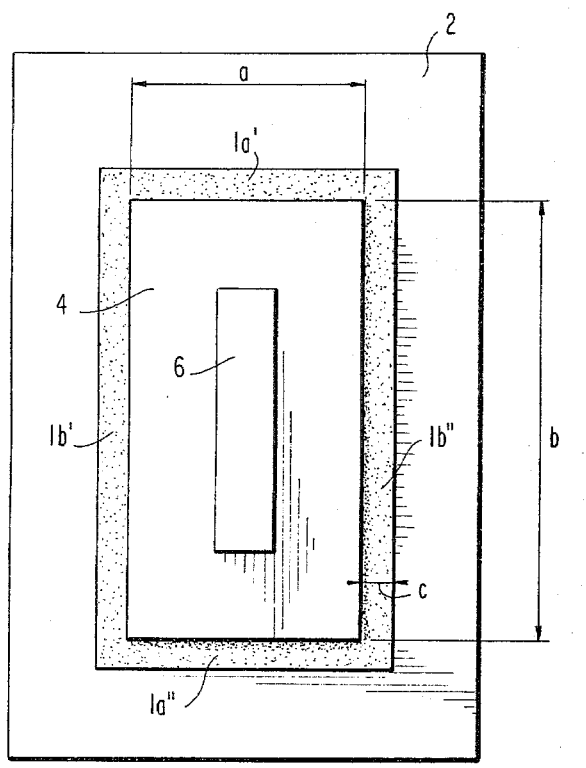

The invention will be described in the following with reference to the accompanying schematic drawings, in which FIG. 1 shows in a vertical section an arrangement for carrying out a method according to the invention and FIG. 2 the same arrangement in a vertical view.

Figure 3:
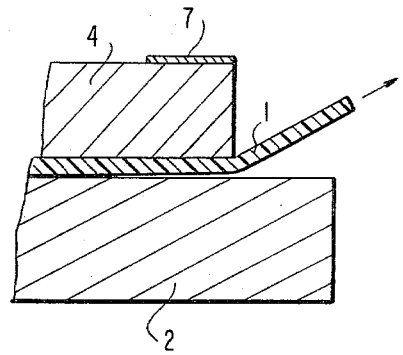

FIG. 3 shows a detail of the arrangement shown in FIG. 1 in one phase of the stretching process.

Figure 4:
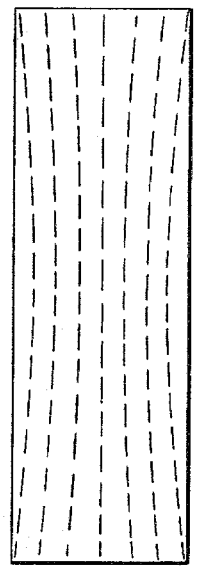

In the drawings 1 designates an approximately 0.2 mm thick, semi-rigid plastic sheet, for example of the type "ALKORTOP", "ALKORFOL HO" or "GISLAVED$^R$ kval 1951", and 2 designates a plane board plate of aluminium. Experiments carried out in connection with the development work which preceded the invention have shown that a very even and firm contact of plastic sheeting of the above-mentioned type against a wood plate, a particle board or the like can be obtained if the plastic sheeting, while being stretched over the plate, is held at a constant temperature of at least 50° C., so that a plastic deformation of the plastic material occurs during the stretching process. If patterned plastic sheeting is used in this way, it is important that the same temperature and thus the same degree of deformation of the plastic sheeting are obtained over the whole coating surface, since there is otherwise a risk that the pattern may become oblique. In a method according to the invention, a very uniform heating is obtained by the fact that the plastic sheeting 1 is placed on a board plate of aluminium which is provided with an evenly distributed, thermostat-controlled heating element 3. The cupboard door 4 which has the length b and the width a is placed on the plastic sheeting 1 so that this has a protruding portion at all door sides, the width of which is c. Then the cupboard door 4 is pressed against the sheet with a pressure of at least 30 kg/m$^2$ with the help of a stationary compression cylinder 5, operating with variable compressive force, the piston rod of which is provided with a pressure-distributing plate 6. The two portions of plastic sheeting projecting at the long sides of the cupboard door are designated 1b' and 1b" and similar portions at the short sides are designated 1a' and 1a". Thereafter, the stretching of the plastic sheeting is started by applying a tensile force to portion 1a' and distributing it along, at the most, ⅔ of the distance a. One might fear that such a stretching operation would either tear off the plastic sheeting at the edge of the cupboard door, or that the entire piece of plastic sheeting 1 would loosen. However, it has proved that when using semi-rigid plastic sheeting in heated condition, it is possible without difficulty to find a stretching pressure at which these extremities are avoided and at which the plastic sheeting is stretched considerably even at a distance of up to 1 meter from the edge of the cupboard door. It has proved that the tensile force required for the plastic deformation of the sheeting to spread from the edge of the cupboard door and over towards the middle portion increases with the distance from the edge of the cupboard door. The force required for a continued stretching and the extension of the plastic sheeting achieved during the stretching can then be used as a criterion that a sufficiently large part of the plastic sheeting has been stretched, that is, also portions of the sheeting located in the vicinity of the transverse centre line of the cupboard door. When this has taken place, the stretched part of the sheeting portion 1a' is folded over the edge of the cupboard door and is pressed firmly against an edge portion 7 on the back of the cupboard door, said portion 7 being pretreated with contact glue. Thereafter, the same stretching and gluing procedure is repeated with further sections of the sheeting portion 1a' until the stretching and gluing of this is completed, whereafter plastic sheeting portions 1a" and 1b' and 1b" are treated in the same manner, the plastic sheeting and the cupboard door all the time being held in unchanged position by means of force device 5. FIG. 4 indicates how a venation running parallel to the longitudinal direction of the plastic sheeting tape can be deformed in certain cases using conventional stretching of plastic sheeting between the short sides of a door or a cupboard door.

The risk of such deformation is considerably smaller when the stretching in longitudinal direction is carried out according to the invention, and a possible deformation can be counteracted more easily during the subsequent cross-stretching when this is performed according to the invention than when using a conventional cross-stretching method.

Thus the invention is a method for direct contact coating of a rectangular rigid cupboard door or the like whose rear surface is pretreated with contact glue with a patterned semi-rigid plastic sheeting without gluing the sheeting to the front surface of the door, said method comprising the steps of:

placing a rectangular piece of plastic sheeting whose width and length are somewhat greater than the corresponding dimension of the cupboard door on a plane, evenly heated supporting plate which is maintained at a constant temperature of at least 50° C., placing the cupboard door in direct contact with the sheeting with the front side down, applying a clamping force on the rear side of the cupboard door with the help of a stationary force device to sandwich the center portion of the sheeting between the door and the plate with the resultant of the clamping force exerted by said device being substantially perpendicular to the front side of the cupboard door, applying a stretching force to a first, fractional portion of a first transversal sheeting margin projecting at one end of the cupboard door, immediate partial gluing of said fractional portion by pressing it against a surface portion on the rear side of the cupboard door pretreated with contact glue, and subsequently subjecting a plurality of marginal portions of other transversal sheeting margins projecting at other edges of the cupboard door to individual longitudinal stretching immediately followed by a corresponding pressure of the stretched marginal portions against said pretreated surface portion of the rear side of the cupboard door, and wherein said applied clamping force is of sufficient strength relative to the stretching forces to said marginal portions of said transverse sheeting to prevent that portion of the sheeting sandwiched between said plate and said cupboard door from being pulled out from between said plate and said cupboard door front, while permitting that sandwiched sheeting portion to be stretched and extended along said marginal portions through which said stretch force is exerted but said applied clamping force is not of such strength that stretching or extension of said sandwiched sheet portion is prohibited.

It is only the marginal edges which are in fact bonded by pretreating of an area with contact glue, the cupboard door is generally rather rigid, the pressure is substantially distributed over the whole front surface of the door and the pressure is not so great that the friction force is sufficient to balance the stretching force component acting on the sheeting parallel to the front surface of the door, in spite of the fact that this stretching force component is sufficiently great to extend, that is, stretch portions of the plastic film which are in clamped condition and located in the vicinity of the transversal centerline of the door.

This implicitly indicates that even sheeting portions located between the point of attack of the stretching force and the extended portions mentioned in the description are subjected to deformation in the form of extension.

A method according to the invention utilizes the principle of first clamping a dominating central portion of a plastic sheeting between two clamping surfaces, subjecting the sheeting to a predetermined minimum temperature below its melting point and thereafter stretching and extending this part by means of a stretching force only balanced by friction forces due to the clamping.

A corresponding method is in fact a compromise between two extremes. One of these extremes takes place when the clamping pressure is too great. In this case, it is not possible to bring about any stretching and extending of the sheeting parts clamped between the clamping surfaces and stretching is limited to the marginal edges or sheeting margins, as stated in the specification.

The other extreme occurs at too low a clamping pressure. In this case, there is no extension of stretching, the force applied simply pulls the clamped plastic sheet out from beneath the door and the plate through which the clamping force is exerted.

As a matter of fact, in an example, three inked lines, each of a length of 100 mm were drawn on a semi-rigid plastic sheeting employed in the coating of a door. The plastic sheeting was oriented in relation to the door in such a manner that the inked lines were disposed longitudinally, one inked line having its center in the center of the door and each of the other inked lines halfway between the corresponding short edge and the center of the door. Upon employing the method of applying the sheeting to the door in accordance with the invention, the length of the inked lines were measured anew and it was observed that the lengths now 110 mm, the stetching being effected completely through the length of that sheeting material.

I claim:

1. A method for direct contact coating of a rectangular rigid cupboard door or the like whose rear surface is pretreated with contact glue with a patterned semi-rigid plastic sheeting without gluing the sheeting to the front surface of the door, said method comprising the steps of:

placing a rectangular piece of plastic sheeting whose width and length are somewhat greater than the corresponding dimension of the cupboard door on a plane, evenly heated supporting plate which is maintained at a constant temperature of at least 50° C., placing the cupboard door in direct contact with the sheeting with the front side down, applying a clamping force on the rear side of the cupboard door with the help of a stationary force device to sandwich the center portion of the sheeting between the door and the plate with the resultant of the clamping force exerted by said device being substantially perpendicular to the front side of the cupboard door, and with the clamping pressure substantially distributed over the whole front surface of the door, applying a stretching force to a first, fractional portion of a first transversal sheeting margin projecting at one end of the cupboard door, immediate partial gluing of said fractional portion by pressing it against a surface portion on the rear side of the cupboard door pretreated with contact glue, and subsequently subjecting a plurality of marginal portions of other transversal sheeting margins projecting at other edges of the cupboard door to individual longitudinal stretching immediately followed by a corresponding pressure of the stretched marginal portion against said pretreated surface portion of the rear side of the cupboard door.

* * * * *